Sept. 15, 1936.     J. E. HULSE     2,054,752
HYDRAULIC EQUALIZING MEANS FOR VEHICLE BRAKES
Filed July 30, 1935     2 Sheets-Sheet 1
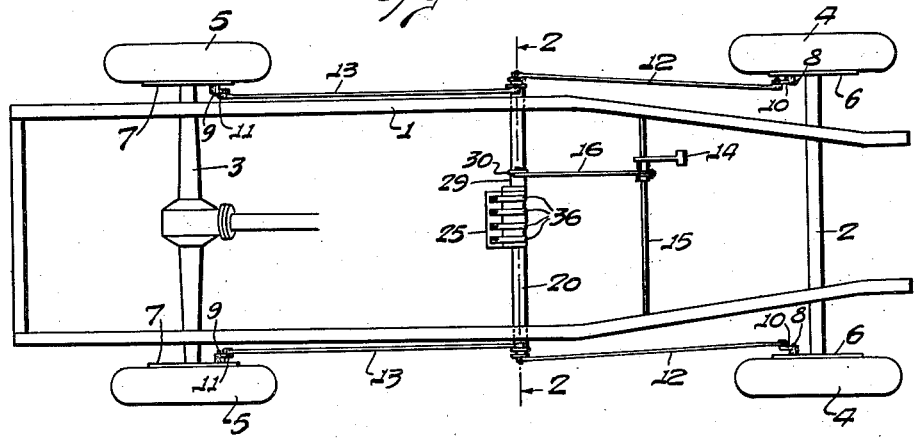
Inventor
JAMES E. HULSE
By Norris + Bateman
Attorneys Sept. 15, 1936.   J. E. HULSE   2,054,752
HYDRAULIC EQUALIZING MEANS FOR VEHICLE BRAKES
Filed July 30, 1935   2 Sheets-Sheet 2
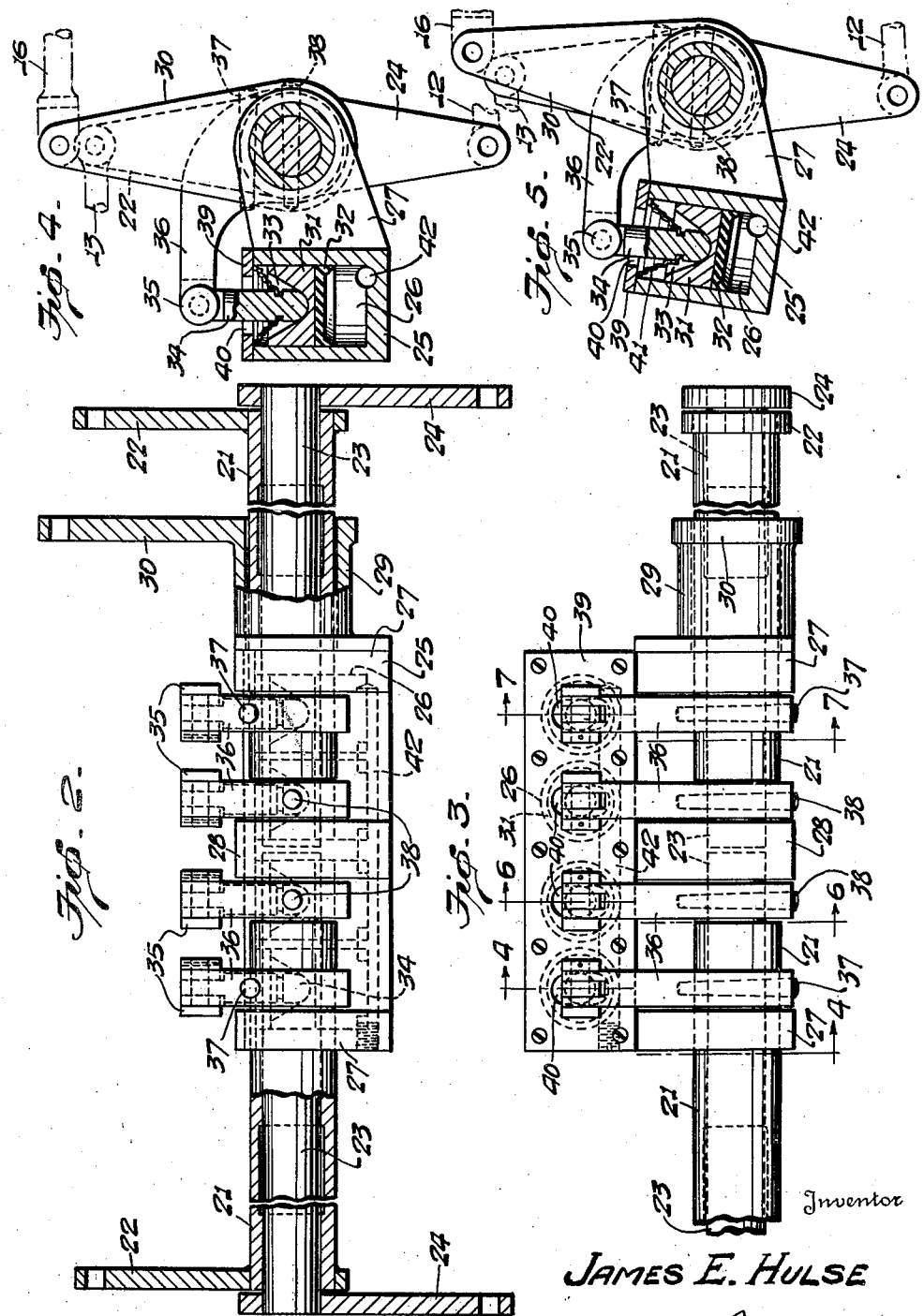
Inventor
JAMES E. HULSE
By Norris & Bateman
Attorneys Patented Sept. 15, 1936

2,054,752

UNITED STATES PATENT OFFICE 2,054,752

HYDRAULIC EQUALIZING MEANS FOR VEHICLE BRAKES

James E. Hulse, Durham, N. C., assignor of one-fourth to Wright's Automatic Tobacco Packing Machine Company, Durham, N. C., a corporation of West Virginia Application July 30, 1935, Serial No. 33,892

9 Claims. (Cl. 188—204)

The present invention relates to brakes for automotive vehicles, and more especially to those employing multiple brakes such as four-wheel brakes for the front and rear wheels of such vehicles.

One of the primary objects of the present invention is to provide relatively simple, efficient and inexpensive means for equalizing the brake action applied to the different brakes comprising the brake system.

Another object is to provide hydraulic means for equalizing the brake action applied to the different brakes of a mechanical brake system whereby equal brake action will be produced by each brake.

Another object is to provide hydraulic equalizing means for a brake system embodying safety means for insuring brake action in the event the liquid employed in the hydraulic equalizing means should be insufficient to function because of leakage or other cause.

A further object of the invention is to provide hydraulic brake equalizing means which is capable of being readily applied to automotive vehicles and connected to the usual brake pedal and brake rods as a substitute for a part of the usual brake mechanism, without requiring other alteration of such brake system.

To these and other ends the invention consists in certain improvements and combinations and arrangements of parts all as will be hereinafter more fully described, the features of novelty being pointed out particularly in the claims at the end of this specification.

In the accompanying drawings:

Figure 1 is a top plan view of the chassis of an automobile equipped with hydraulic brake equalizing means according to the present invention;

Figure 2 is a view partly in section on the line 2—2 in Fig. 1 and partly in elevation and on an enlarged scale, showing the improved hydraulic equalizing means;

Figure 3 is a top plan view of a portion of the structure shown in Fig. 2;

Figure 4 is a vertical section taken on the line 4—4 in Fig. 3, showing the equalizing means in its normal inactive condition;

Figure 5 is a view similar to Fig. 4 but showing the equalizing means in its active condition;

Figures 6 and 7 are vertical sections taken on the lines 6—6 and 7—7 respectively in Fig. 3;

Figure 8 is a detail view, partly in section, of the casing forming the cylinders for the equalizing means;

Figure 9 is a top plan view of the casing shown in Fig. 8; and

Figures 10 and 11 are sections taken on the lines 10—10 and 11—11 respectively in Fig. 8.

Similar parts are designated by the same reference characters in the different figures.

Hydraulic equalizing means according to the present invention is applicable generally to the brakes of vehicles of various kinds although it is more particularly applicable to the multiple brakes, such for example as the four-wheel brakes, of automotive vehicles, for the purpose of producing equal brake action by the different brake units comprising the brake system. The preferred embodiment of the invention is shown in the accompanying drawings and will be hereinafter described in detail, but it is to be understood that the invention is not restricted to the precise constructions shown since equivalent constructions are contemplated and such will be included within the scope of the claims.

In the present instance and as shown in the accompanying drawings, the invention is shown applied to an automobile of conventional construction equipped with four-wheel brakes, 1 designating the usual automobile frame, 2 and 3 the front and rear axles and 4 and 5 the front and rear wheels, the front wheels being provided respectively with brakes 6 and the rear wheels being provided respectively with brakes 7. The brakes may be of any conventional or preferred form the details of which form no part of this invention, the brakes being shown for purposes of illustration as provided with cam shafts 8 and 9 having levers 10 and 11 thereon for rocking them to expand an internal band, for example, into braking engagement with the brake drums fixed to the respective wheels, as is well understood in the art. The levers 10 for actuating the front wheel brakes are operated as usual by a pair of brake rods 12 which are adapted to be pulled rearwardly to set these brakes, and the actuating levers 11 for the brakes of the rear wheels are connected to a pair of brake rods 13 which are adapted to be pulled forwardly to set said brakes. 14 represents the usual brake pedal which may be mounted on a cross shaft 15 supported in the automobile frame, the brake pedal being operatively connected to the main brake rod 16.

According to the present invention, the front wheel and rear wheel brakes are all operated mechanically by depressing the brake pedal 14, and the brake action transmitted from the brake pedal to the individual brakes is equalized hydraulically by equalizing means 20 which is connected to the brake rods 12 and 13 and the main brake rod 16 and may be mounted in the automobile frame in place of the rock shaft heretofore used generally for actuating the brake rods. This equalizing means, according to the present invention, comprises a pair of axially alined tubular or sleeve-like shafts 21 having levers 22 welded or otherwise fixed on their outer ends and extending upwardly therefrom, the brake rods 13 for the rear wheel brakes being pivotally connected to the upper ends of these levers, and a pair of axially alined shafts 23 which are rotatably mounted within the shafts 21 and have levers 24 welded or otherwise fixed to their outer ends and extending downwardly therefrom, the brake rods 12 for the front wheel brakes being pivotally connected to these levers. The shafts 21 and 23 are individually rotatable relatively to one another and this shaft assembly is mounted crosswise in the automobile frame, the sleeve-like shafts 21 for example being rotatably mounted in suitable bearings in the respective side members of the frame.

The equalizing means also comprises a casing 25 which is formed with cylinders 26 which correspond in number to the number of brakes comprising the brake system, four cylinders being shown in the present instance. This casing is formed with a pair of arms 27 into which the inner ends of the sleeve-like shafts 21 are fitted rotatably, and the casing is also formed with an arm 28 into which the inner ends of the shafts 23 are fitted rotatably, so that the casing is supported to swing or rock about the common axis of the shafts 21 and 23 and said shafts are independently rotatable relatively to the casing. One end of the casing is bolted or otherwise fixed to a sleeve 29 which is rotatably mounted upon one of the sleeve-like shafts 21, and the sleeve 29 has an arm 30 fixed thereon and extending upwardly therefrom, this arm being pivotally connected to the main brake rod 16 connected to the brake pedal 14, so that the casing will swing upwardly when the brake pedal is pushed forwardly or depressed, as in applying the brakes.

Each cylinder 26 of the casing has a piston or plunger 31 fitted to reciprocate therein and a cupped rubber or other suitable sealing cap 32 is provided beneath each piston. The upper end of each piston is formed with a recess 33 in which a connecting rod 34 rests, the upper end of each connecting rod being pivotally connected by a pivot pin 35 to a lever 36. Two of these levers are fixed to the sleeve-like shafts 21, as by the keys or pins 37 and the other levers are fixed to the inner ends of the shafts 23 as by the pins or keys 38. The tops of the cylinders in the casing 25 are covered by a cover plate 39 which is secured to the top of the casing, this cover plate having slot-like openings 40 therein through which the respective connecting rods 34 extend, these openings 40 being narrower than the length of the pivot pins 35, so that the ends of these pivot pins will bear firmly on the top of the cover plate 39 in the event the pistons move beyond a predetermined extent into their cylinders. In order to seal the cylinders against the entrance of dust, a substantially conical corrugated dust cup of rubber or other suitable flexible material 41 may be attached to each connecting rod and fitted into the upper end of the respective cylinder, or any other suitable location. The bottoms of the cylinders 26 are filled with a suitable liquid, such for example as oil, and an intercommunicating passageway 42 is formed in the casing and communicates with the bottoms of all of the cylinders therein.

The mode of operation of the brake system provided with hydraulic equalizing means as hereinbefore described is as follows:—Normally or when the brakes are not applied, the casing 25 will be in its relatively lowered position as shown in Figure 4, the brake pedal 14 being then in its non-actuated position. The pistons 31 in the cylinders 26 in the casing 25 will then occupy positions near the tops of said cylinders. The brakes are applied by depressing or pushing forwardly the brake pedal 14. Such movement of the brake pedal tensions the main brake rod 16 which, acting on the lever 30, swings the casing 25 fixed thereto, upwardly or into the position shown in Figure 5. Since the spaces in the cylinders beneath the pistons are filled with oil or other liquid and such oil or liquid is confined within the casing, such liquid will be placed under compression by the upward swing of the casing 25 and will act to transmit motion and power from the casing to the pistons therein to cause the latter to move upwardly with the casing, and since the pistons are connected individually to the respective shafts 21 and 23 by the levers 36, the motion and power thus imparted to the pistons by the oil or liquid will be transmitted individually to the respective shafts 21 and 23, causing the latter to rotate and thereby actuate the respective brake rods 12 and 13 in directions to apply the brakes on the front and rear wheels. Since a separate piston and cylinder is provided for each of the two shafts 21 and each of the two shafts 23 and the cylinders are in intercommunication through the passageway 42, equal brake applying force will be applied to each one of the four brake rods since the hydraulic pressure will act equally on all of the pistons. Equal brake action will thus be produced on each of the brakes of the vehicle, notwithstanding that the brakes or their connections may be adjusted unequally, the body of oil or liquid acting in common upon all of the pistons functioning as an equalizing medium. For example, if one or more of the brakes or their connections are not properly adjusted to produce effective brake action on the respective wheel or wheels, the pistons connected to the other brakes will relatively move downwardly in their cylinders, as shown in Figure 5, thus forcing oil or liquid from these cylinders into the cylinders for the pistons connected to the brakes which are inefficiently adjusted, thereby insuring the transmission of power equally to all of the brakes to effect equalized brake action thereon.

In the event the casing contains an insufficient amount of oil or liquid to transmit the required movement between the casing and the pistons to set the brakes, as might occur from leakage of oil from the casing, the upward swing of the casing 25 under the action of the brake pedal in applying the brakes will bring the cover plate 39 into direct mechanical engagement with the pivot pins 35 connected to the levers 36, and the movement of the brake pedal will then be transmitted directly and mechanically to the brake rods and effect application of the brakes, this constituting a safety feature which will avoid failure of the brakes in the event of a deficiency in amount of oil or other equalizing liquid in the cylinders.

By constructing the brake rod actuating shafts, cylinder casing and pistons and actuating levers as herein shown and described, the hydraulic equalizing means provided by the present invention may be readily and inexpensively applied to automobiles in place of the usual rock shafts for actuating the brake rods, without requiring any alteration in the rest of the brake system, which may be of any usual or conventional construction. The construction of the equalizing means is also such as to avoid the necessity of using piping for the equalizing liquid, which is subject to leakage and breakage and otherwise objectionable.

The present invention enables a brake system to be used which comprises mechanically actuated brakes at the wheels of the vehicle the action of which is equalized hydraulically, without the disadvantages of employing hydraulic brake-actuating cylinders at the wheels and extending piping thereto as in so-called hydraulic brakes as heretofore used or proposed, it thus possessing the advantages of mechanically actuated brakes equalized hydraulically, without the disadvantages of so-called hydraulic brakes, and the safety means provided, as hereinbefore described, insures effective brake action at all times and under all conditions.

I claim as my invention:—

1. In brake mechanism for vehicles comprising an operating member and a plurality of brake actuating members operative thereby, a plurality of axially alined independently rotatable elements connected respectively to said brake actuating members, a fluid containing member connected to said operating member for rotation thereby about the axis of said elements and having an alined row of intercommunicating cylinders therein, and a plurality of pistons connected individually to the respective elements and operative independently in the respective cylinders and subject in common to pressure applied to the fluid contained in said fluid containing member.

2. In brake mechanism for vehicles comprising an operating member and a plurality of brake actuating members operative thereby, a plurality of axially alined independently rotatable shafts connected respectively to said brake actuating members, a fluid containing member mounted to rotate about the axis of said shafts and connected to said operating member for operation thereby, and a plurality of pistons connected individually to the respective shafts and subject in common to pressure applied to the fluid contained in said fluid containing member.

3. In brake mechanism for vehicles comprising an operating member and a plurality of brake actuating members operative thereby, a plurality of axially alined independently rotatable shafts connected respectively to said brake actuating members, a casing rotatably mounted on said shafts to rotate about the axis thereof and connected to said operating member for operation thereby, said casing containing a fluid, a plurality of pistons movably fitted into said casing and subject in common to the pressure of the fluid therein, and means operatively connecting said pistons individually to the respective shafts.

4. In brake mechanism for vehicles comprising an operating member and a plurality of brake actuating members operative thereby, a plurality of axially alined independently rotatable shafts connected respectively to said brake actuating members, a casing rotatably mounted on said shafts to rotate about the axis thereof and connected to said operating member for operation thereby, said casing having a plurality of intercommunicating cylinders therein to contain a fluid, a plurality of pistons mounted to reciprocate respectively in said cylinders, and means operatively connecting said pistons individually to the respective shafts.

5. In brake mechanism for vehicles comprising an operating member and a plurality of brake actuating members operative thereby, a pair of axially alined shafts and another pair of axially alined shafts sleeved over the first-mentioned shafts, means for connecting said shafts individually to the respective brake-actuating members, a casing having portions forming bearings rotatably fitted on said pairs of shafts and connected to said operating member for operation thereby, said casing containing a fluid, a plurality of pistons reciprocable in said casing and subject in common to pressure of the fluid therein, and means individually and independently connecting said pistons to the respective shafts.

6. In brake mechanism for vehicles comprising an operating member and a plurality of brake actuating members operative thereby, a pair of axially alined shafts and another pair of axially alined shafts sleeved over the first-mentioned shafts, means for connecting said shafts individually to the respective brake-actuating members, a casing having portions forming bearings rotatably fitted on said pairs of shafts and connected to said operating member for operation thereby, said casing containing a fluid, a plurality of pistons reciprocable in said casing and subject in common to pressure of the fluid therein, and a plurality of levers fixed individually to the respective shafts and operatively connected individually to the respective pistons.

7. In brake mechanism for vehicles comprising an operating member and a plurality of brake actuating members operative thereby, a pair of axially alined shafts and another pair of axially alined shafts sleeved over the first-mentioned shafts, means for connecting said shafts individually to the respective brake-actuating members, a casing having spaced lugs thereon forming bearings rotatably fitted to the inner ends of said pairs of shafts and connected to said operating member for operation thereby, said casing containing an equalizing liquid, a plurality of pistons individual to the respective shafts and fitted to reciprocate individually in said said casing but subject in common to pressure of the liquid therein, and levers fixed to the inner ends of said shafts between said lugs on the casing and having means for actuating them individually from the respective pistons.

8. In brake mechanism for vehicles comprising an operating member and a plurality of brake actuating members operative thereby, a pair of axially alined shafts and another pair of axially alined shafts sleeved over the first-mentioned shafts, means for connecting said shafts individually to the respective brake-actuating members, a casing having a row of cylinders formed therein and a passageway connecting them, said casing containing an equalizing liquid, means rotatably mounting the casing on said shafts for rotation about the axis thereof, means connecting the casing to said operating member for operation thereby, pistons reciprocable individually in said cylinders but subject in common to pressure of the liquid therein, and a row of levers fixed to the respective shafts and having means for actuating them individually from the respective pistons.

9. In brake mechanism for vehicles comprising an operating member and a plurality of brake actuating members operative thereby, a pair of axially alined shafts and another pair of axially alined shafts sleeved over the first-mentioned shafts, means for connecting said shafts individually to the respective brake-actuating members, a casing having a row of cylinders formed therein and a passageway connecting them, said casing containing an equalizing liquid, means rotatably mounting the casing on said shafts for rotation about the axis thereof, means connecting the casing to said operating member for operation thereby, pistons reciprocable individually in said cylinders but subject in common to pressure of the liquid therein, a row of levers fixed to the respective shafts and having means for actuating them individually from the respective pistons, and a cover plate on the casing for the cylinders therein engageable with portions on said levers to actuate them in the absence of liquid in the casing.

JAMES E. HULSE.